E. W. ALLEIGH.
Assignor, by mesne assignments, to THE NATIONAL EMBOSSING MACHINE COMPANY.
TWO PART CYLINDER AND DIE FOR ORNAMENTING WOOD AND OTHER COMPRESSIBLE MATERIAL.
No. 11,122. Reissued Nov. 18, 1890.
Fig. 1.
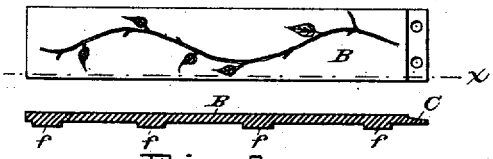
Fig. 2.
Fig. 3.
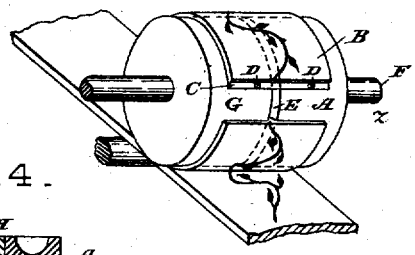
Fig. 4.
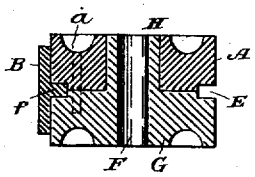
INVENTOR:
Edward W. Alleigh
By Marble, Mason & Campfield
his Attorneys.
WITNESSES:
E. B. Bolton
C. L. Davis
THE NORRIS PETERS CO., PHOTO-LITHO., WASHINGTON, D. C.

UNITED STATES PATENT OFFICE.

EDWARD W. ALLEIGH, OF CHICAGO, ILLINOIS, ASSIGNOR, BY MESNE ASSIGNMENTS, TO THE NATIONAL EMBOSSING MACHINE COMPANY, OF NEW JERSEY.

TWO-PART CYLINDER AND DIE FOR ORNAMENTING WOOD AND OTHER COMPRESSIBLE MATERIAL.

SPECIFICATION forming part of Reissued Letters Patent No. 11,122, dated November 18, 1890.

Original No. 400,626, dated April 2, 1889. Application for reissue filed April 28, 1890. Serial No. 349,837.

*To all whom it may concern:*

Be it known that I, EDWARD W. ALLEIGH, a citizen of the United States, and a resident of Chicago, county of Cook, and State of Illinois, formerly of Minneapolis, county of Hennepin, and State of Minnesota, have invented new and useful Improvements in Two-Part Cylinders and Dies for Ornamenting Wood and other Compressible Material, of which the following is a specification, reference being had to the annexed drawings, making a part hereof, in which—

Figure 1 is a face view of a die before it is bent to fit the cylinder; Fig. 2, a longitudinal section thereof on dotted line *x*. Fig. 3 is a perspective representation of the two-part cylinder and the die shown at Fig. 1, bent to fit its periphery and attached thereto; Fig. 4, a longitudinal central section of the cylinder on line *z*, Fig. 3.

This invention relates to an improvement in cylinders and dies for pressing ornaments in wood and other compressible material in imitation of carving.

It has been the custom heretofore to construct the cylinders for the dies in machines of this class in a single piece provided with a circumferential groove, in or by which the die was held by means of a flange or rib on its under surface, which dies could not cover more than half of the circumference of the cylinder, requiring in consequence a much larger cylinder than where a longer die, as I provide, is employed, which, by reason of the cylinder being formed in two pieces with a circumferential groove at the junction of the separate parts, may be placed in position before the parts of the cylinder are united.

It has also been the custom, as shown in printing-presses, particularly the one patented to R. M. Hoe on March 8, 1859, to employ a series of segment printing-dies on the peripheries of cylinders. Therefore I do not claim a segment-die on a rotating cylinder irrespective of the construction herein described and claimed.

It is necessary in practice that the two-part cylinder and die, with reference to themselves, be absolutely rigid and turn on the shaft as one body. This I prefer to accomplish by a single hub, which serves as a bearing for both parts of the cylinder on the supporting-shaft.

It will be understood that two-part cylinders which can be separated where internally-ribbed dies of greater length than one-half the circle are to be employed are a necessity, and that the smaller cylinders are less expensive and are better adapted for imprinting, in that less surface is presented to the wood in a given time.

G H represents one part of the two-part cylinder and A the other part, the two being when in position for use rigidly and firmly fastened and held together by a screw or screws *a*, as shown in Fig. 4. The part H extends through the part A, as shown in Fig. 4, and through the part G H is formed a round smooth hole, whereby the cylinder is permitted to turn on a shaft F and between the parts G, H, and A, and in the periphery of the two parts is formed an annular groove E to engage a continuous or sectional rib *f f*, formed on the middle portion of the inside of the die B to keep said die in line.

The end C of the die B is provided with holes, through which a screw or screws D, Fig. 3, is put into each of the two parts of the cylinder, thus fastening the die B to the cylinder, and also in connection with the screw *a*, Fig. 4, hold the two parts of the cylinder together and the die thereto. The die B is cast flat in brass or other suitable metal, with the desired figure thereon, and is then bent to fit the two-part cylinder, and when the die is to be replaced by another of a different pattern it is done by removing the screws D D and *a* and separating the part A of the cylinder from the other part G H. From this it will be seen that the die B is only fastened at one end, and therefore it cannot buckle when brought in a heated state against the material to be imprinted with suitable force to make a permanent impression, and that it is because the cylinder is in two parts that a die nearly covering its periphery can be used and removed. It is evident that many changes may be made in the construction and combination of parts of my invention without departing from the scope thereof.

Having thus described my invention, its construction and operation, I claim and desire to secure by Letters Patent the following:

1. In a machine for ornamenting wood, a cylinder or die-support consisting of a series of parts securely fastened together and adapted to turn as one cylinder upon a common shaft, a circumferential groove at the junction of the parts, and a die provided with a flange or rib on its under surface adapted to enter said groove, the die being placed in position before the parts of the cylinder are united, substantially as shown and described.

2. In a machine for ornamenting wood, a cylinder or die-support consisting of a series of parts securely fastened together and adapted to turn as one cylinder upon a common shaft, a circumferential groove at the junction of the parts, and a die provided with a flange or rib on its under surface adapted to enter said groove, substantially as shown and described.

3. In a machine for ornamenting wood, a cylinder or die-support consisting of two parts securely fastened together, the cylinder being provided with a circumferential groove at the junction of the parts, in combination with a die having a rib or projections on its inner or concave surface adapted to enter said groove, substantially as shown and described.

4. In a machine for ornamenting wood, a two-part cylinder provided with a circumferential groove at the junction of the parts, in combination with a die of greater length than half the circumference of the cylinder and having a rib or projections on its inner surface adapted to enter said groove, the parts of the cylinder being securely fastened together, substantially as shown and described.

5. In a machine for ornamenting wood, a two-part cylinder or die-support, one part of which is provided with a hub on which is placed the other part, a groove surrounding the cylinder at the junction of the parts, and a die provided with a rib or projections on its under surface adapted to enter said groove, substantially as shown and described.

6. In mechanism for ornamenting wood, the two-part cylinder G, provided with an annular groove E between said parts, in combination with the die B, removably secured thereto, and a groove E, engaging the sectional ribs *f f* of the die, as and for the purpose specified.

7. In mechanism for ornamenting wood, a two-part cylinder consisting of the part G, provided with the hub H, and the part A, placed on said hub, and the part G, with its hub H, provided with a continuous bearing for the supporting-shaft, and the periphery of the cylinder provided with an annular groove between said parts, in combination with a segment-die B, provided with a rib engaging said groove and fastened at one end to the two-part cylinder, as specified and shown.

EDWARD W. ALLEIGH.

Witnesses:
CLARENCE L. DAVIS,
BENJ. HASKELL.